H. McN. SHWAB.
GAGE.
APPLICATION FILED APR. 16, 1919.

1,314,435. Patented Aug. 26, 1919.

WITNESSES
Edw. Thorpe
A. L. Kitchin

INVENTOR
Hugh M. Shwab
BY
ATTORNEYS

UNITED STATES PATENT OFFICE.

HUGH McNEILLY SHWAB, OF LOUISVILLE, KENTUCKY.

GAGE.

1,314,435.   Specification of Letters Patent.   Patented Aug. 26, 1919.

Application filed April 16, 1919. Serial No. 290,461.

*To all whom it may concern:*

Be it known that I, HUGH M. SHWAB, a citizen of the United States, and a resident of Louisville, in the county of Jefferson and State of Kentucky, have invented a new and Improved Gage, of which the following is a full, clear, and exact description.

This invention relates to gages for indicating the air pressure, and has for an object the provision of an improved gage and associate parts whereby the same may be attached either temporarily or permanently to the valve stem of a tire to indicate continually or intermittently the pressure in the tire.

Another object in view is to provide a valve gage associated with a valve and a valve depressing member, the arrangement being such that the pressure of the tire associated with the gage is always in communication with the gage so as to accurately indicate the pressure.

A further object of the invention is to provide a gage in which a valve is arranged between the expanding member and the side carrying the air pressure so that the gage will operate only when properly set or adjusted for operation.

A still further object, more specifically, is the arrangement of a gage which is adapted to be connected to the valve stem of an automobile tire and to remain in position when the tire is in use, the construction being such that the pressure in the tire will not act on the expansible member of the gage during the ordinary use of the tire.

Figure 1:
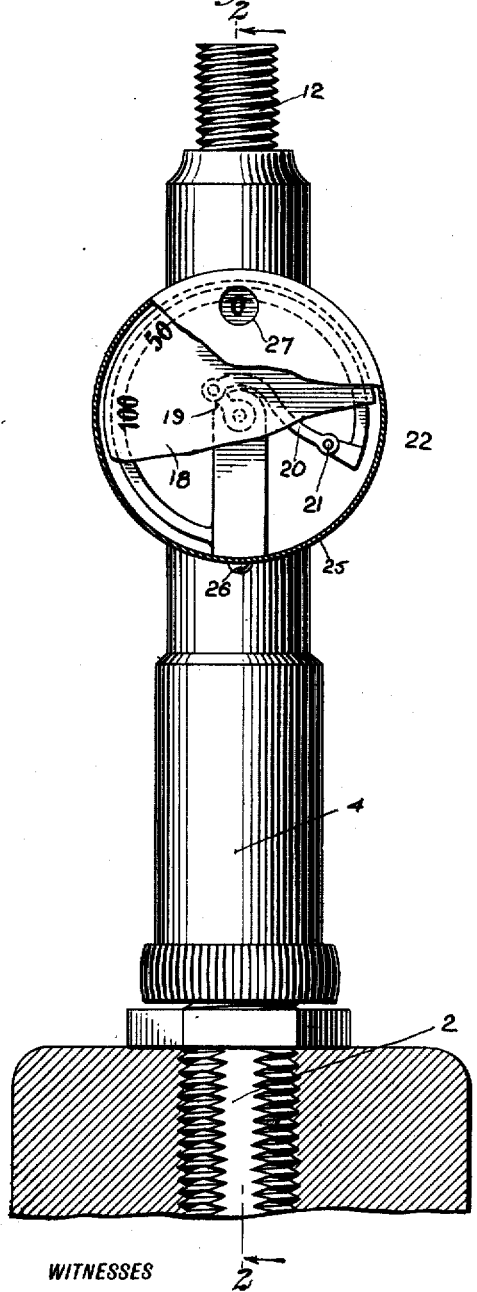
Figure 1 is a side view of a gage with certain parts in section disclosing an embodiment of the invention.
Figure 2:
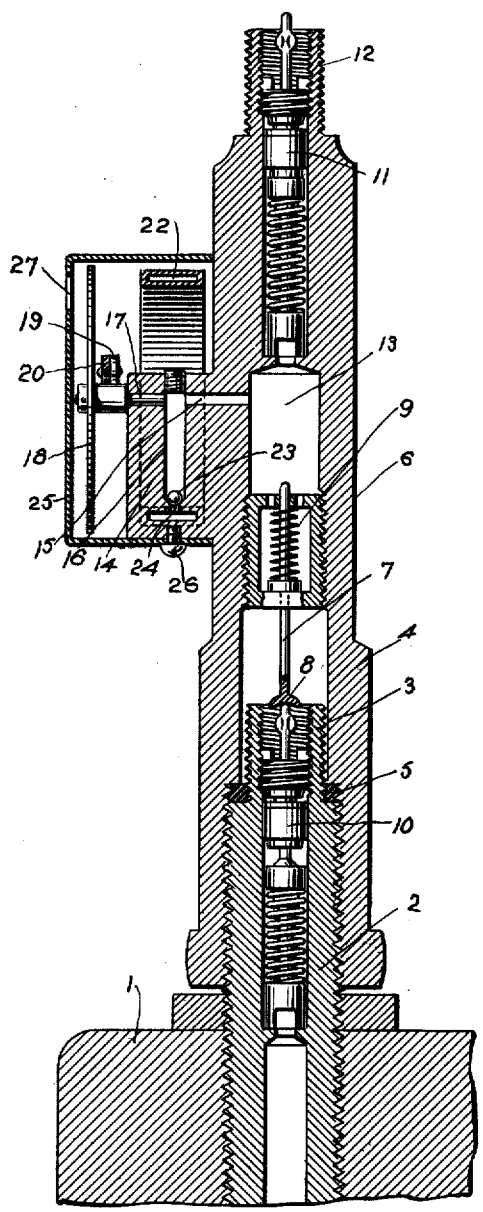
Fig. 2 is a vertical sectional view through Fig. 1 on line 2—2.

Referring to the accompanying drawing by numerals, 1 indicates the felly of a wheel through which the valve stem 2 extends, said valve stem being of the ordinary type, as for instance an ordinary Schrader valve. Ordinarily this valve would carry a cap with a threaded end 3, but when the gage embodying the invention is used the barrel 4 of the gage will be screwed over the valve stem 2 as shown in Fig. 2, while a gasket 5 may be used for providing a tight connection. The barrel 4 carries a removable sleeve 6 which in turn carries a rod 7 having an enlargement 8 at the lower end, said rod being acted upon by spring 9 so as to open the valve mechanism 10 when the barrel 4 is screwed down into position. A suitable valve mechanism is arranged at the upper end of the barrel 4, it being preferably of the Schrader type now in common use. When it is desired to inflate the tire a pump or other air supply is connected to the end 12 and air is forced past the mechanism 11 into the barrel 4 and from thence through the mechanism 10 into the tire. The valve mechanism 11 prevents the air from returning from the tire though the air may freely pass mechanism 10 into the space 13 by reason of the fact that the valve mechanism 10 is held open by rod 7. Spring 9 is provided in order to prevent any breakage in case of great resistance and is ordinarily sufficiently strong to hold the rod 7 in position for depressing valve mechanism 10 against its supporting spring. Preferably formed integral with the barrel 4 is a lug 14 which together with barrel 4 is preferably cast and provided with the suitable passageways described. If desired the passageways 15 and 16 are bored, the outer end of passageway 15 acting as a support for the journal 17 which journal supports the disk 18. This disk is provided with a comparatively short arm 19 to which is pivotally connected a link 20 which in turn is pivotally connected at 21 to an expansible member 22, said member 22 being hollow as indicated in Fig. 2 and welded or otherwise rigidly secured to the lug or enlargement 14 near the bottom thereof. A valve mechanism is arranged between the passageway 16 and the interior of the expansible member 22. This valve member is preferably a ball 23 resting against a suitable seat at one end of the reduced passageway 24 which connects the passageway 16 with the interior of the expansible member 22. A suitable casing 25 is held in place by screw 26 or any other suitable means whereby the parts just described are all covered except, of course, a small part of disk 18 which may be seen through the opening 27. Disk 18 is provided with numbers 20 to indicate pounds and thereby indicate to any one the condition, or rather the pressure of air in the tire at any time.

During the time that the tire is receiving air pressure will be maintained in the expansible member 22 and will gradually increase with the pressure in the tire showing at all times the pressure in the tire. After the desired supply of compressed air has been provided the pump or other source of air supply is removed and a cap is provided on the end 12. Preferably the entire gage is left in position on the tire so as to be ready for use or inspection at any time. In the ordinary use of the tire on an automobile or other vehicle it is quite often the case that the tire is depressed at some point by striking a stone or other object whereby the pressure in some other part of the tire is gradually increased, whereas as soon as the stone has been passed the pressure is decreased. This goes on more or less continuously at all times, and to prevent this increase and decrease in pressure acting on the expansible member 22 and thereby injuring the same the valve formed from the ball 23 and associate parts is provided. It will be noted that the bore or passageway 16 extends parallel with the barrel 4 or in a radial direction in respect to the centrifugal action of the wheel. The rapidly rotating wheel will naturally cause the ball 23 under centrifugal force to maintain the passageway 24 closed so that as the pressure increases and decreases in the chamber 13 such increase and decrease will not be communicated to the expansible member 22. This arrangement protects the expansible member against sudden additional pressure either caused by a depression of the tire or by a pump. It will, of course, be understood that a ball valve always acts more or less as a check valve, but when standing still under an even pressure air will naturally find its way around the same as the fitting between the ball and seat is never absolutely perfect, and it is not the intention in the present instance to make the same perfect. In this way a normal pressure on the gage will be had and the ball will always serve to check any unusual pressure when driving. In addition to this, when pumping up the tire gage will not be subject to pressure at each stroke of the pump, but will move gradually up as the air finds its way around the ball.

What I claim is:

1. A tire gage comprising a barrel adapted to be threaded over the end of a valve, means in the barrel for causing the valve to remain open when the barrel is threaded over the valve, a valve mechanism arranged at the upper end of the barrel for preventing the escape of air from the barrel, an indicating mechanism, means for operating said indicating mechanism, said means comprising an expansible member in free communication with the interior of said barrel, and a valve for preventing sudden variations in pressure in the barrel from actuating the expansible member.

2. A gage for tires comprising a barrel adapted to be connected with the valve of a tire, said barrel being provided with means for holding the valve open, a second valve arranged in the barrel for preventing the escape of air from the barrel, a projection arranged on one side of said barrel formed with a passageway extending in a direction normal to the barrel, a second passageway extending from the first mentioned passageway, an expansible member in communication with said second passageway, a valve arranged between said second passageway and said expansible member, and an indicating means connected with the expansible member for indicating the pressure.

3. A gage for automobile tires comprising a tubular member adapted to be in free communication with the interior of the tire, a projection arranged on one side of the tubular member, a passageway extending in a direction normal to the tubular member, a second passageway extending from the first passageway and substantially parallel with the tubular member, a hollow expansible member connected with said projection, a third passageway connecting the second passageway with the expansible member, a ball arranged to substantially close said third passageway, and an indicating member operated by said expansible member.

4. A gage of the character described comprising a hollow expansible member, an indicator operated by the expansible member, a tubular member formed with a passageway connecting the interior of the tubular member with the hollow expansible member, and a centrifugally actuated valve positioned to close said passageway when the gage is rotated.

HUGH McNEILLY SHWAB.

Copies of this patent may be obtained for five cents each, by addressing the "Commissioner of Patents, Washington, D. C."